United States Patent
Joug et al.

[15] 3,688,894
[45] Sept. 5, 1972

[54] FLUID SUPPORTED CONVEYOR

[72] Inventors: Roland Joug, Nohanent; Bernard Ragout, Clermont, both of France

[73] Assignees: Pneumatiques Caoutchouc Manufacture et Plastiques Kleber-Colombes, Colombes, France; Ateliers Mecaniques du Douaisis, Douai, France

[22] Filed: Feb. 16, 1971

[21] Appl. No.: 115,626

[52] U.S. Cl. ..................................198/184
[51] Int. Cl. ..................................B65g 15/28
[58] Field of Search..................198/1, 184, 204

[56] References Cited

UNITED STATES PATENTS 3,592,329   7/1971   Fleischauer...............198/184

*Primary Examiner*—Edward A. Sroka
*Attorney*—Holcombe, Wetherill & Brisebois

[57] ABSTRACT

In a conveyor in which the conveyor belt is supported above a duct by an air cushion, a projection fixed to the belt travels in a channel for supplying air to the duct. When the load is normal the projection attached to the belt partially obstructs the orifices through which the air passes into the duct, but leaves them completely open in the case of an increase load.

9 Claims, 6 Drawing Figures

PATENTED SEP 5 1972 3,688,894

FLUID SUPPORTED CONVEYOR

SUMMARY OF THE INVENTION

This invention relates to a conveyor in which the movable load carrying member is supported on a cushion of gas, which is usually air.

In the following specification for purposes of simplification the terms "air" and "air cushion" will be used instead of "fluid" and "fluid cushion," but it is to be understood that any suitable fluid may be used. For the same reason, when reference is made to conveyors, by analogy with existing conveyor belts, the term "belt" will be used to designate the movable member of the conveyor, regardless of the shape and nature of that movable member.

Air cushions have been more and more used to support movable members of all types, but in all cases, whether the vehicles or platforms produce the air cushion themselves, or individual load supporting members or belts circulate above an infrastructure producing the current of air, the flow of air admitted to form the cushion remains constant, even if the weight of the load varies. It follows that when the weight of the load supported varies, the height of the out flow varies, together with the altitude of the movable member, until a new equilibrium has been attained.

This presents serious disadvantages, especially in those applications, such as conveyor belts, in which the variations in the weight of the load may be very substantial and in which it is not possible to provide means for varying the output of the blowers as a function of the changes in the weight of the load or as a function of the altitude which is to be imparted to the movable member.

This invention relates to a conveyor consisting of a movable member supported by an air cushion which moves above an infrastructure in which the flow of air admitted to form the cushion is kept a constant function of the weight of the movable member with its load. In the apparatus according to the invention any variation in the altitude of the movable member, due for example to a change in the weight of the load transported, results in a variation in the flow of air supplied so that the movable member returns to its original height.

The invention relates particularly to conveyors equipped with a conveyor belt.

The apparatus according to the invention consists of a movable member which travels above a coverless duct maintained at a pressure greater than atmospheric pressure, and is especially characterized by the fact that it comprises at least one projection fixed to the movable member and at least one projection fixed to the infrastructure. One of these projections is hollow and pierced by openings through which air is introduced into the duct and the two projections are separated from each other during normal operation and so positioned that the flow of air which, coming through the orifices of one of the projections to supply the duct, varies when the movable member changes altitude. This variation in the altitude of the movable member produces, for example, a modification in the spacing of the projections. The invention will be described in greater detail with reference to the several embodiments illustrated in the accompanying schematic drawings, in which:

Figure 1:
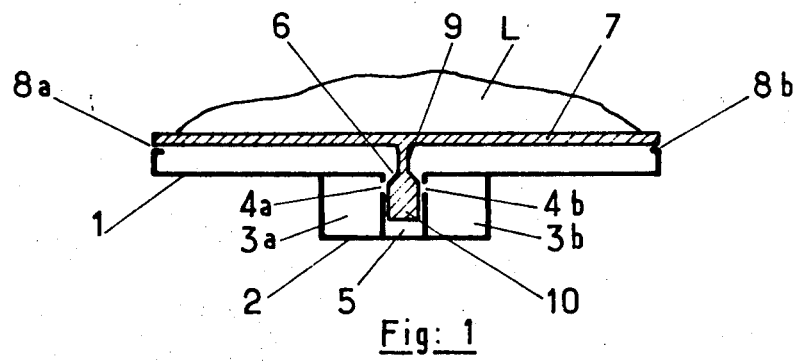
FIG. 1 is a sectional view of a conveyor belt according to the invention.
Figure 2:
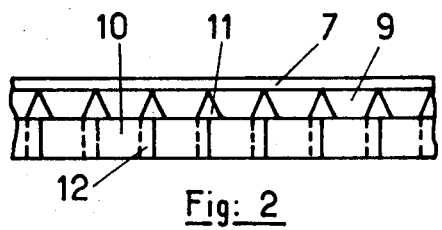
FIG. 2 shows the profile of the belt of FIG. 1.
Figure 3:
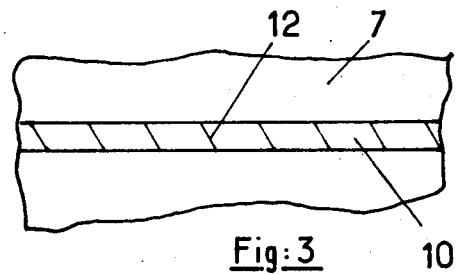
FIG. 3 is a bottom plan view of the belt of FIG. 1.

In the embodiment illustrated in FIGS. 1, 2 and 3, the infrastructure comprises a duct 1 which has no cover. At the bottom of this duct 1 is mounted a central projection 2 defining two laterally spaced channels 3a and 3b. A flow of air under pressure circulates through the channels 3a, 3b, which are pierced by orifices or slots 4a and 4b through which part of the air passes into the space 5 separating the two channels and then into the duct 1 through the longitudinal slot 6 therein. The duct 1 is thus constantly maintained at a pressure greater than atmospheric pressure.

Above the duct is a conveyor belt 7, with a load L thereon said belt and load being supported by the air under pressure in the duct. This air escapes constantly through the spaces 8a and 8b which separate the edges of the belt from those of the duct.

The belt 7 comprises a central longitudinal projection 9 attached to its lower surface. The lower edge of this projection is widened at 10 and travels in the space 5 which separates the two channels 3a and 3b. This projection moves vertically of the openings or slots 4a and 4b when the altitude of the belt changes.

Moreover, transverse vertical partitions, not shown, separate the duct into independent or nearly independent sections. In FIG. 1, the apparatus is shown in an equilibrium position. Pressure of the air inside the duct balances the weight of the belt 7 and the load 11 carried thereby. If the weight increases, the altitude of the belt decreases, which results in decreasing the air flow through 8a and 8b and the movement toward the bottom of the projection 9 with its thickened edge 10. This latter movement increases the section available for the passage of air through the orifices 4a and 4b and thus increases the flow of air into the duct. Since the amount of air escaping decreases and the amount of incoming air increases, the pressure inside the duct increases, thus lifting the belt to a new equilibrium position.

If, on the contrary, the weight of the load decreases, the apparatus operates in a contrary manner.

Thus, in the device according to the invention, the flow of air is automatically kept a constant function of the weight of the load. It will be noted that, since the duct is separated into independent sections by transverse partitions, this regulation takes place for each section, and thus follows along the path of travel of the belt.

FIGS. 2 and 3 show more specifically how the projection 9 with its thickened edge 10 is made. It is necessary to permit the belt to roll on the drums at each end of its path of travel. The projection 9 is therefore with triangular cut outs 11, cut out by a punch and in any other suitable manner, and regularly distributed throughout its length. The enlargement 10 which is in the form of a continuous strip is slit obliquely to its plane of symmetry. The slits 12 are distributed over its entire length and a slit 12 corresponds to each cut out 11. As the belt travels over the drums, the different segments formed by the parts of the thickened edge which are situated between two biassed slits, rotate and slide on each other.

Figure 4:
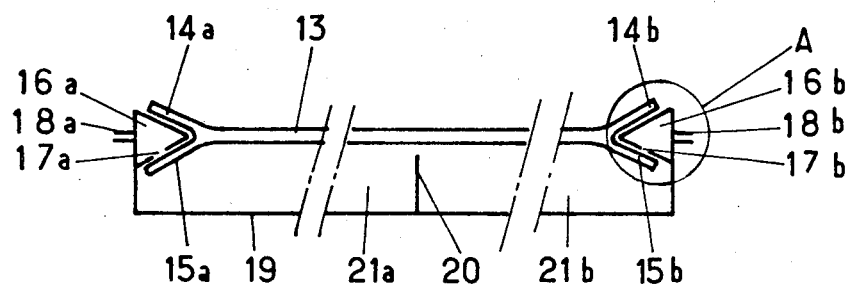
FIG. 4 is a sectional view through another conveyor belt according to the invention.
Figure 5:
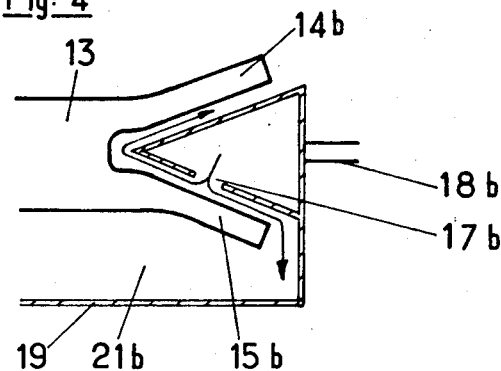
FIG. 5 is an enlarged view showing the part A of FIG. 4.

In the foregoing example the conveyor belt is flat. The conveyor could function in the same way if the belt were a V-belt and even if its edges were attached to each other in such a manner as to form a channel-shaped belt. In the embodiment illustrated in FIGS. 4 and 5 a conveyor belt 13 comprises two longitudinal V-shaped channels. These channels are formed in part by the edges of the belt and part by the lips 14a, 15a, 14b, and 15b which are spaced one from the other. Lips 14a, 15a, 14b and 15b are in this case made of a material such that their longitudinal flexibility permits them to roll without difficulty or excessive constraint on the front and back drums of the conveyor. These channels along the edge of the strip may be made separately and then attached to the belt, or they may be made during the course of the manufacture of the belt so as to be integral therewith.

The infrastructure of the conveyor comprises two longitudinal projections 16a and 16b having a section the shape of a triangle and so placed that the summit of this triangle corresponds to the bottom of the V-shaped channels which extend along the edges of the belt. The projections 16a and 16b are hollow and their lower surfaces are pierced by orifices 17a and 17b which are regularly spaced along their length. Ducts 18a and 18b, in the case of projections 16a and 16b, carry air at a pressure greater than atmospheric pressure.

The infrastructure of the conveyor consists of the coverless duct 19, above which the belt 13 travels, the two projections 16a and 16b being fixed to the upper edge of the two lateral surfaces of the duct 19 so as to project inwardly thereinto. Advantageously the duct 19 comprises a longitudinal partition 20 which separates it into two channels 21a and 21b and transverse partitions, not shown on the figure. The air delivered by the ducts 18a and 18b into the projections 16a and 16b passes through orifices 17a and 17b following the path indicated by the arrows of FIG. 5. Thus on each edge of the belt, a double cushion of air is formed partly between the lips 14 and the external surfaces of the projection 16 and between the lips 15 and the internal surfaces of the projection 16. This double cushion of air keeps the strip 13 in position while at least partially supporting it, and above all guiding it.

Moreover, at least one part of the air coming from the projection 16 enters into the ducts 21a and 21b which are thereby brought to a pressure greater than that atmospheric pressure.

This greater pressure, which is exerted, on almost the entire length of the belt, makes a very important contribution to the support of the belt. It will be noted at this point that the partial enclosure of the lateral projections of the strip by the projections 16 and the presence of the moving air in the space separating the two projections creates a certain seal between the duct and the belt.

A controlled escape of air from the duct may be produced so that the excess pressure does not exceed a certain value and, in particular, does not inhibit movement of air from the orifices 17 in the ducts 21a and 21b.

The excess pressure in the duct substantially supports the belt, but additional air may be introduced directly into the ducts 21a and 21b, for example, during operation of the belt, or when the flow of air through the orifice 17 is too small to compensate for the escape from the ducts 21a and 21b.

The stability and guiding of the belt 13 thus results from the partial insertion of the lateral projections 16 into the channels in the edge of the belt.

If the belt 13 has its tendency to come closer to the duct, for example due to an overload, the lips 14a and 14b approach the corresponding surfaces 15 of the projections, which causes an increase in the force supporting the strip resulting from the action of the air on the lips 14 and thus tends to space the belt from the duct.

Moreover, the escape of air to the outside is reduced and the flow of air entering the duct increases. All this increases the pressure inside the duct, thus increasing the support exerted on the belt by the air under pressure.

If, on the contrary, for example, because the load lightens, the belt tends to rise further above the duct, a converse action takes place and brings the belt back to a new equilibrium position.

If one side of the belt approaches the duct while the other side makes an inverse movement, the regulatory action of the air on the lips of each of the V-shaped channels at the edges of the belt produce forces opposed to such movement. Moreover, since the partition 20 separates the duct into two compartments 21a and 21b, the pressure of one increases whereas the other decreases, which also produces forces which resist such movement.

If the belt has a tendency to slip to one side, the space separating the V-shaped projection at the edge of the belt from the channel 16 decreases. The lateral force directed against the center of the belt and exerted by the air from the orifices 17 then increases, whereas at the other side a converse action takes place. Thus the belt is constantly urged toward its equilibrium position.

Figure 6:
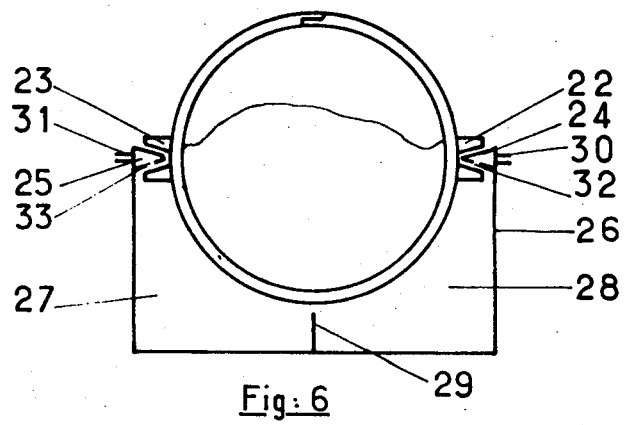
FIG. 6 is a sectional view through another conveyor according to the invention.

In the embodiment of FIG. 6, the belt, the edges of which are bent to form it into a tube, comprises two V-shaped projections 22 and 23 which are analogous to the V-shaped channels of the belt 13 of the preceding embodiment. These projections 22 and 23 are attached substantially along the generatrices corresponding to the horizontal plane of symmetry of the belt. The projections 22 and 23 are partially seated on the projections 24 and 25 carried by a duct 26 which is itself divided into two compartments 27 and 28 by a partition 29. The projections 24 and 25 are hollow and receive air under pressure through the ducts 30 and 31. This air passes through the opening 32 and 33 into the spaces separating the projections 22 and 23 from the projections 24 and 25. The device operates as in the preceding embodiment, but it should be noted that it makes it possible to provide a conveyor in which the belt has a shape which permits it to carry a maximum load in proportion to its width.

What is claimed is:

1. Apparatus in which a movable member travels above a coverless duct carrying a fluid under greater than atmospheric pressure, said movable member being provided with a longitudinal projection, and said duct being provided with a substantially parallel hollow projection through which it is supplied with said fluid under pressure, said hollow projection being pierced by orifices through which said fluid passes to reach the duct, and said projections being spaced from each other in normal operations and positioned one with respect to the other so that an upward movement of the movable member partially blocks said orifices and thus decreases the flow of air admitted into the duct, and a downward movement of the movable member has the effect of unblocking said orifices and thereby increasing this flow of fluid.

2. Apparatus as claimed in claim 1 in which the duct is divided into sections by transverse partitions.

3. Apparatus as claimed in claim 1 in which said movable member is a conveyor belt, and said hollow projection comprises two parallel passageways supplied with a fluid under pressure, said passageways being separated one from the other and pierced by orifices opening into a space in said hollow projection separating the two passageways, and the projection from said movable member has an enlarged base which travels in the space between the two passageways in the projection attached to the duct and partially blocks the orifices in these canals.

4. Apparatus as claimed in claim 1 in which the belt is closed to form a tube.

5. Apparatus as claimed in claim 1 in which said movable member is a conveyor belt and comprising two hollow projections for supplying the duct with fluid which are attached to the upper edges of the duct so as to project inwardly thereof and are pierced by orifices in their lower surfaces situated toward the inside of the duct, said conveyor belt carrying on each of its edges a concave projection which partially receives the corresponding projection carried by the duct.

6. Device as claimed in claim 5 in which the duct is divided into longitudinal parts by partitions.

7. Device as claimed in claim 1 in which the duct comprises means in addition to said projections for introducing and permitting the escape of fluid.

8. Apparatus as claimed in claim 5 in which the belt is bent on itself so as to form a tube and the projections are fixed to the two generatrices corresponding to the horizontal plane of symmetry of the belt.

9. Apparatus as claimed in claim 5 in which the projections carried by the duct are triangular in section and the projections carried by the belt are formed with two spaced lips made of a flexible material.

* * * * *